J. Hanes,
Plow.
No. 45,995. Patented Jan. 24, 1865.
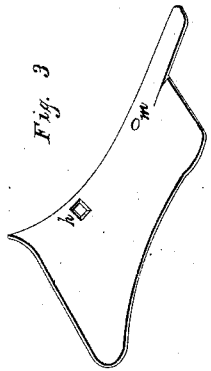
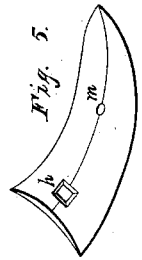
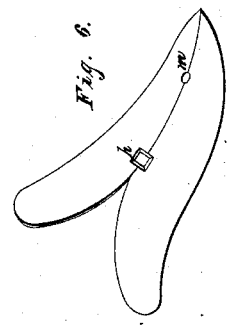
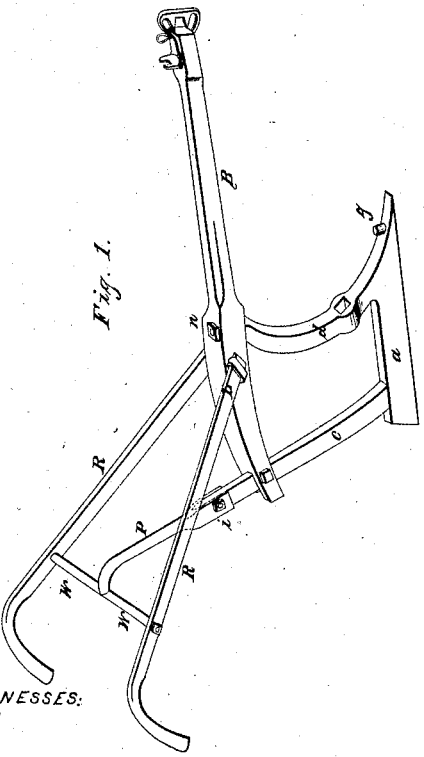
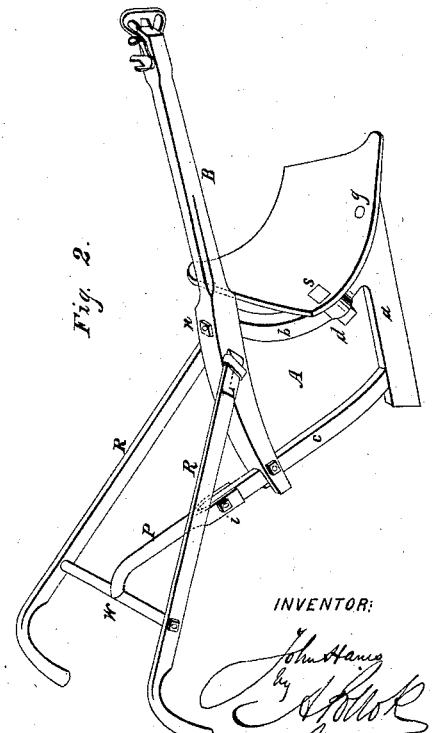
WITNESSES:
INVENTOR:

UNITED STATES PATENT OFFICE.

JOHN HANES, OF POLKVILLE, KENTUCKY.

IMPROVEMENT IN PLOWS.

Specification forming part of Letters Patent No. 45,995, dated January 24, 1865.

*To all whom it may concern:*

Be it known that I, JOHN HANES, of Polkville, in the county of Warren and State of Kentucky, have invented certain new and useful Improvements in Plows; and I hereby declare that the following is a full, clear, and exact description of the same, reference being had to the accompanying drawings, in which—

Figure 1 is a perspective view of a plow-stock provided with beam and handles made in accordance with this my invention. Fig. 2 is a like view of the same with a plowshare attached; and Figs. 3, 4, 5, and 6 are views of plowshares adapted for various uses or under different circumstances.

The breaking, turning up, and preparing of the soil for the reception of the seed requires plows of various forms, according to the nature of the ground and the depth and width of the furrows intended to be produced.

It will be unnecessary here to explain the various plows used or useful and necessary on most farms, suffice to say that a number of plows are required to perform the work of a farm, involving considerable outlay in farming implements of this description, besides the care and time to keep them in good working order.

The object of this invention is to dispense with a large number of plows, and thus to effect economy in the first outlay, time, and labor; and I have effected my said object by the construction and arrangement, hereinafter described, of what I term the "interchangeable plow;" and my invention consists in forming the curved front bar of the plow-stock with an eye and stud, and, in combination therewith, forming the interchangeable plowshares, or the equivalents thereof, of corresponding curvature and with corresponding openings, so that by the simple application of a bolt either of said plowshares may be adjusted and securely held in place.

To enable others to make and use my invention, I shall now proceed to describe the construction and operation of my improved interchangeable plow.

In the said drawings, A is the plow-stock. It is composed of three parts—to wit, first, the ground-bar $a$, extending horizontally in the line of draft; second, the curved front bar, $b$, springing from the toe of the ground-bar, and describing a curve of requisite form to suit the various plowshares, shovels, or other like implements to be applied, and reaching the beam B, where it terminates in a screw-threaded shank, which, passing through the beam, is by means of a nut, $n$, firmly secured to it; third, the brace $c$. This is a bar united with the ground-bar at the heel thereof, and passes through the forked end of the beam, to which it is firmly bolted. At $d$ the curved front bar is enlarged, and a hole of square or other angular sectional area traverses the enlargement at right angle to the tangent at that point of the curve.

Toward the point of the front bar projects a stud, $g$, of a height equal to the thickness of the interchangeable pieces, so that when either of them is applied the stud will be flush with the surface of the mold-board or shovel, or the equivalent thereof.

The plowshares, as before stated, are of various forms, according to the uses they are applied to. To illustrate, I have shown right and left hand plowshares, a common shovel and turning-shovel, a small meadow, and a stony-ground shovel. They are all curved at the back, so as to snugly fit the front bar, and a square and a round hole, $h$ and $m$, is formed to correspond respectively to the square hole and the round stud in the front bar. The edges of the square hole I prefer to bevel so as to flare toward the outer surface, and the bolt-head used is accordingly bevel-faced on the under side. By this arrangement the head of the bolt will be flush with the surface of the plowshare. The bolt $s$ itself is square-shanked, so as to allow of the nut being put on without turning the bolt.

From the above description it will be readily seen that the plow may be converted into plows of various kinds by simply loosening the nut on the bolt $s$, and by removing the plowshare and substituting in lieu thereof another plowshare or blade.

Any suitable or convenient mode of attaching the handles R to the beam may be adopted. In this instance they are inserted into loops L at the sides of the beam, and are prevented from being disconnected by means of a bolt, $i$, uniting the brace $c$ with the branched end of the upper brace, P, abutting against traverse-rod w.

Having thus described my invention and the manner in which the same is or may be carried into effect, I claim—

Forming the plow-stock—that is, the curved front bar, b, ground-bar a, and brace c—in one piece, in combination with the manner herein described and shown of adjusting the same to the beam B and handles R through the intermediary of the brace P and cross-bar w, substantially as set forth.

In testimony whereof I have signed my name to this specification before two subscribing witnesses.

JOHN HANES.

Witnesses:
  H. GRIDER,
  H. Y. GARDNER.